United States Patent
Kim et al.

(10) Patent No.: US 9,634,507 B2
(45) Date of Patent: Apr. 25, 2017

(54) POWER SOURCE SUPPLYING DEVICE FOR ELECTRONIC APPLIANCE

(71) Applicant: ENXT Co., Ltd., Seoul (KR)

(72) Inventors: Bo Nam Kim, Seoul (KR); Soo Uk Lee, Seoul (KR); Jun Tae Hwang, Seoul (KR)

(73) Assignee: ENXT CO., LTD., Seoul (KR)

( * ) Notice: Subject to any disclaimer, the term of this patent is extended or adjusted under 35 U.S.C. 154(b) by 120 days.

(21) Appl. No.: 14/680,113

(22) Filed: Apr. 7, 2015

(65) Prior Publication Data

US 2015/0288210 A1  Oct. 8, 2015

(30) Foreign Application Priority Data

Apr. 7, 2014 (KR) ................ 10-2014-0041307

(51) Int. Cl.
*H02J 7/00* (2006.01)
*H01M 10/46* (2006.01)

(52) U.S. Cl.
CPC .......... *H02J 7/0052* (2013.01); *H02J 7/0044* (2013.01); *H02J 7/0054* (2013.01); *H02J 7/0047* (2013.01)

(58) Field of Classification Search
CPC .................................... H02J 7/0052
USPC ................................ 320/107, 101
See application file for complete search history.

(56) References Cited

U.S. PATENT DOCUMENTS

| | | | | |
|---|---|---|---|---|
| 4,178,751 A | * | 12/1979 | Liautaud | A44C 5/0053 224/175 |
| 5,889,735 A | * | 3/1999 | Kawata | H01L 35/00 136/205 |
| 6,992,952 B2 | * | 1/2006 | Endo | G04G 21/04 368/10 |
| 2007/0042821 A1 | * | 2/2007 | Lee | H04M 1/6066 455/575.6 |
| 2010/0211080 A1 | * | 8/2010 | Trivisani | G08B 21/0286 606/120 |
| 2015/0192903 A1 | * | 7/2015 | Vondle | G04G 17/08 368/317 |

* cited by examiner

*Primary Examiner* — M'Baye Diao
(74) *Attorney, Agent, or Firm* — Paratus Law Group, PLLC

(57) ABSTRACT

A power supply device of an electronic device including: a body formed to wear or to carry in a user body; a support groove formed in an upper portion of the body and that receives the electronic device; an insertion groove formed to insert from the outside to the inside of the body; a battery inserted into the insertion groove and that charges power applied from the outside and that charges the electronic device through charged power; a first through hole punched in the support groove so that the electronic device and the battery contact; and a pressing portion that presses to enclose the electronic device received in the support groove and that is provided to receive in the body regardless of a shape or a size of the electronic device.

7 Claims, 5 Drawing Sheets

(Fig.3)
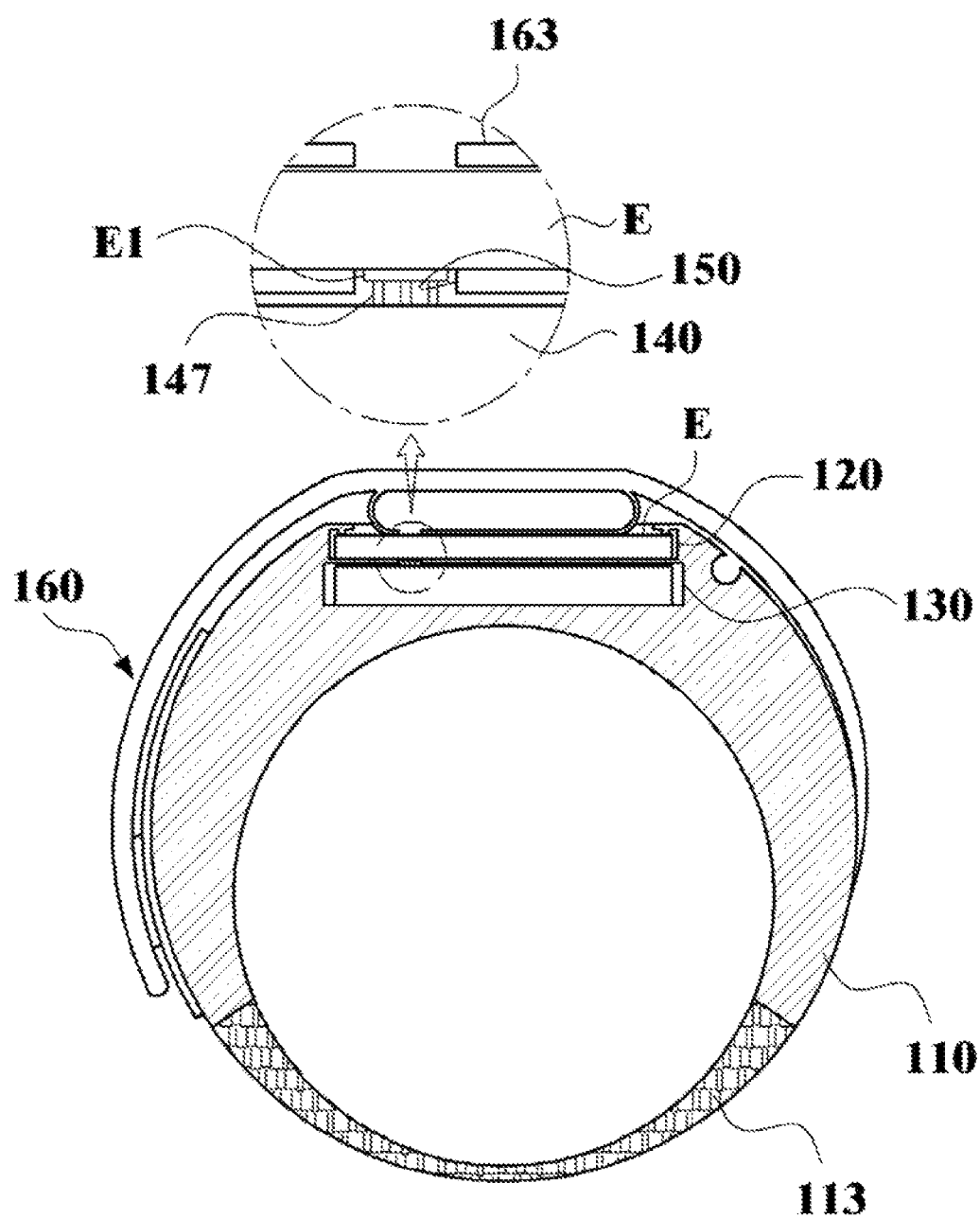

Fig.4)
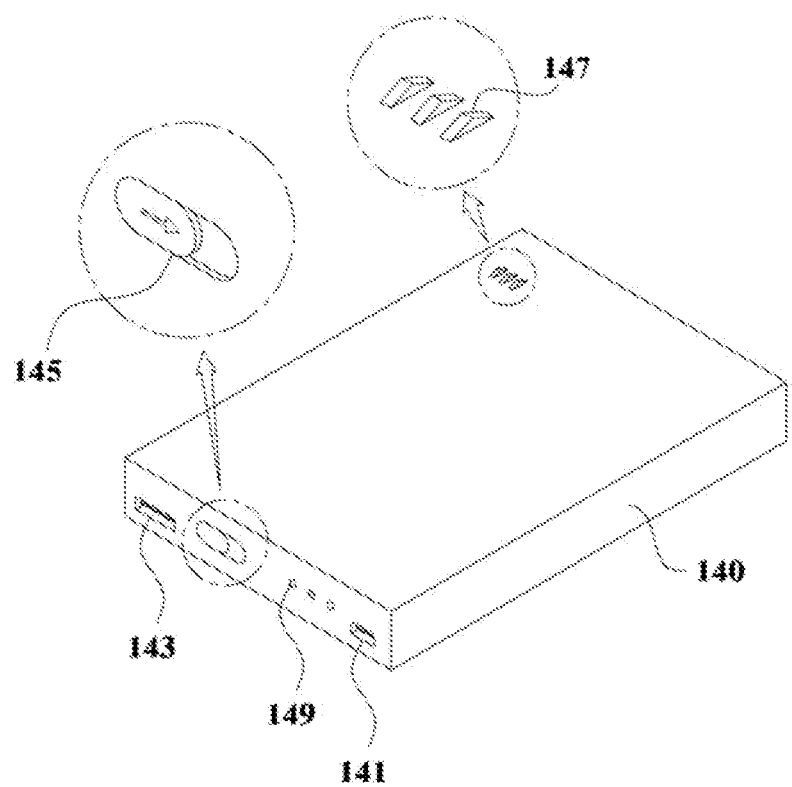
(a)
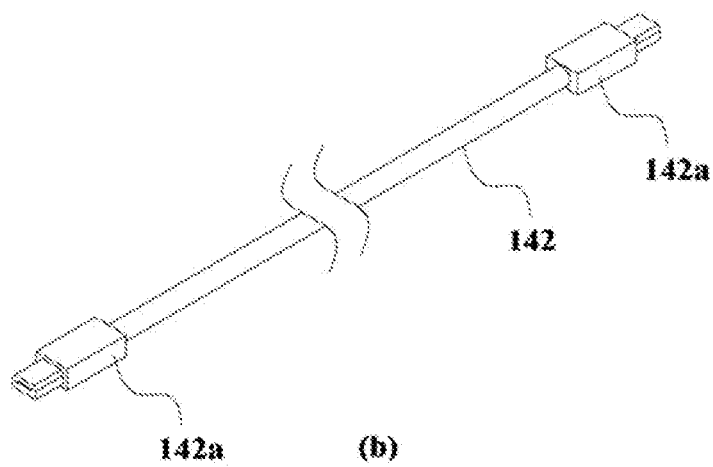
(b)

POWER SOURCE SUPPLYING DEVICE FOR ELECTRONIC APPLIANCE

CROSS REFERENCE TO PRIOR APPLICATION

This application claims priority to Korean Patent Application No, 10-2014-0041307 (filed on Apr. 7, 2014), which is hereby incorporated by reference in its entirety.

FIELD OF INVENTION

The present invention relates to a power supply device of an electronic device, and more particularly, to a power supply device of an electronic device that can charge in a capacity much more a charge capacity of a lithium battery provided in an electronic device and provided within a battery and that can charge in an electronic device for a long time and that can charge the electronic device and extend a use time of the electronic device to a long time, even if an emergency situation occurs because a user can conveniently wear and carry through a body without separation of the electronic device received at a support groove.

DESCRIPTION OF THE RELATED ART

In general, modern people has an electronic device such as a smart phone or a mobile phone as daily necessity, and such an electronic device can be used for Internet search or music reproduction and is thus widely used.

Because such electronic device is used by a lithium battery previously charged therein, a use time of the electronic device is determined according to the number of cells of the lithium battery, and when charge is required, after charging the lithium battery for a constant time by plugging in a separate charger, the electronic device is used.

However, there is a problem that a lithium battery housed in such an electronic device does not provide a charge capacity that can fully stably use in an emergency situation in which another communication means does not exist, particularly, a point separated in a long distance or at a time awaiting an ambulance worker by distress while climbing a mountain due to a capacity limitation of current charge. That is, in a situation in which an electronic device is urgently required, due to discharge of a lithium battery, the electronic device cannot be used, and in this case, a user is in an emergency situation that cannot recharge or in a situation in which an auxiliary lithium battery is not prepared, there is a drawback that a mobile terminal cannot be used.

SUMMARY OF INVENTION

Problem to be Solved by the Invention

The present invention has been made in view of the above problems, and provides a charge device that can charge with a capacity much more than a charge capacity of a lithium battery provided in an electronic device and that can conveniently wear or carry and that thus can charge an electronic device and can extend a use time of the electronic device, even if an emergency situation occurs at a user.

Means for Solving Problems

In accordance with an aspect of the present invention, a power supply device of an electronic device includes: a body formed to wear or to carry in a user body; a support groove formed in an upper portion of the body and that receives the electronic device; an insertion groove formed to insert from the outside to the inside of the body; a battery inserted into the insertion groove and that charges power applied from the outside and that charges the electronic device through charged power; a first through hole punched in the support groove so that the electronic device and the battery contact; and a pressing portion that presses to enclose the electronic device received in the support groove and that is provided to receive in the body regardless of a shape or a size of the electronic device.

Preferably, the body includes: an opening punched from one end to the other end of the body so as to wear in a user body; and an expansion member formed to extend in a lower portion of the body and that adjusts a diameter width of the opening according to a body of a wearer.

Preferably, the battery includes: a second charge terminal that charges external power to the battery through an adaptor; a switch provided to select one of a battery charge mode that charges power to the battery by the external power and an electronic device charge mode that charges power charged in the battery in the electronic device; a contact point pin formed at an upper surface of the battery to expose to the outside through the first through hole and that contacts with the electronic device to enable to charge; and an indicating lamp that displays an amount charged within the battery.

Preferably, the battery includes a charge cable cable-connected to the battery so as to charge the electronic device received in the support groove, wherein the charge cable is insertion coupled to an insertion groove formed in a lengthwise direction at an outer surface of the body.

Preferably, the battery further includes a first charge terminal connected to one end of the charge cable.

Preferably, the body is punched at the inside of the support groove and includes a cable insertion hole into which the other end of the charge cable is inserted.

Preferably, the pressing portion includes: a cover rotatably formed so that one side is connected to an outer surface of the body and that encloses the electronic device received in the support groove by a rotation; and a pressing body provided at an outer surface of the cover and that presses an upper surface of the electronic device when the cover rotates.

Preferably, the pressing body has a space portion that receives the electronic device therein.

Advantages

According to the present invention, differently from a conventional case, a power supply device can be charged with a capacity much more than a charge capacity of a lithium battery provided within a battery and provided in an electronic device and thus can charge the electronic device for a long time, and a user can easily wear or carry the power supply device through a body without separation of the electronic device received at a support groove and thus even if an emergency situation occurs, the electronic device can be charged and a use time of the electronic device can be simultaneously extended for a long time.

BRIEF DESCRIPTION OF THE DRAWINGS

FIGS. 2 and 3 are cross-sectional views illustrating a power supply device of an electronic device according to an exemplary embodiment of the present invention.

FIG. 4 is a perspective view illustrating a battery of a power supply device of an electronic device according to an exemplary embodiment of the present invention.

DETAILED DESCRIPTION OF EXEMPLARY EMBODIMENTS

Hereinafter, a power supply device of an electronic device (hereinafter, referred to as a 'power supply device') according to an exemplary embodiment of the present invention will be described in detail with reference to the accompanying drawings. Before describing, an electronic device E described in the present invention means a portable player that can output an audio signal, such as a smart phone, a mobile phone, and an MP3 player.

Figure 1:
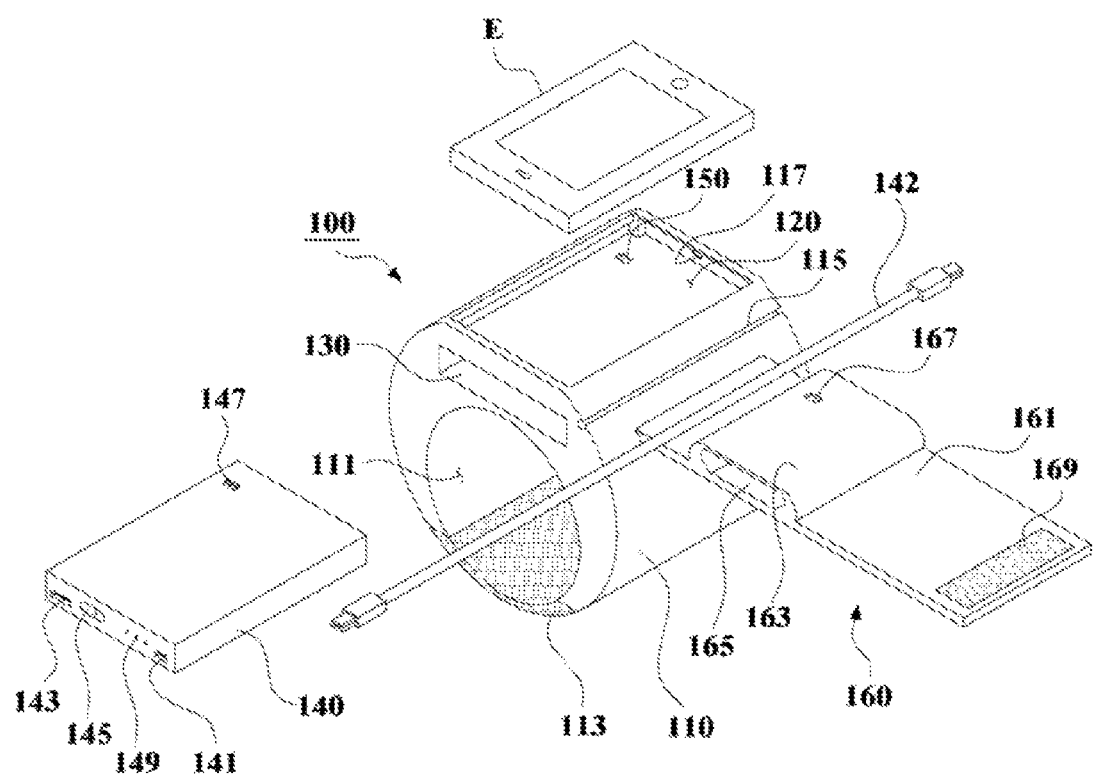
FIG. 1 is an exploded perspective view illustrating a power supply device of an electronic device according to an exemplary embodiment of the present invention.

First, as shown in FIG. 1, a power supply device 100 according to an exemplary embodiment of the present invention includes a body 110, a support groove 120, an insertion groove 130, a battery 140, a first through hole 150, and a pressing portion 160.

Figure 2:
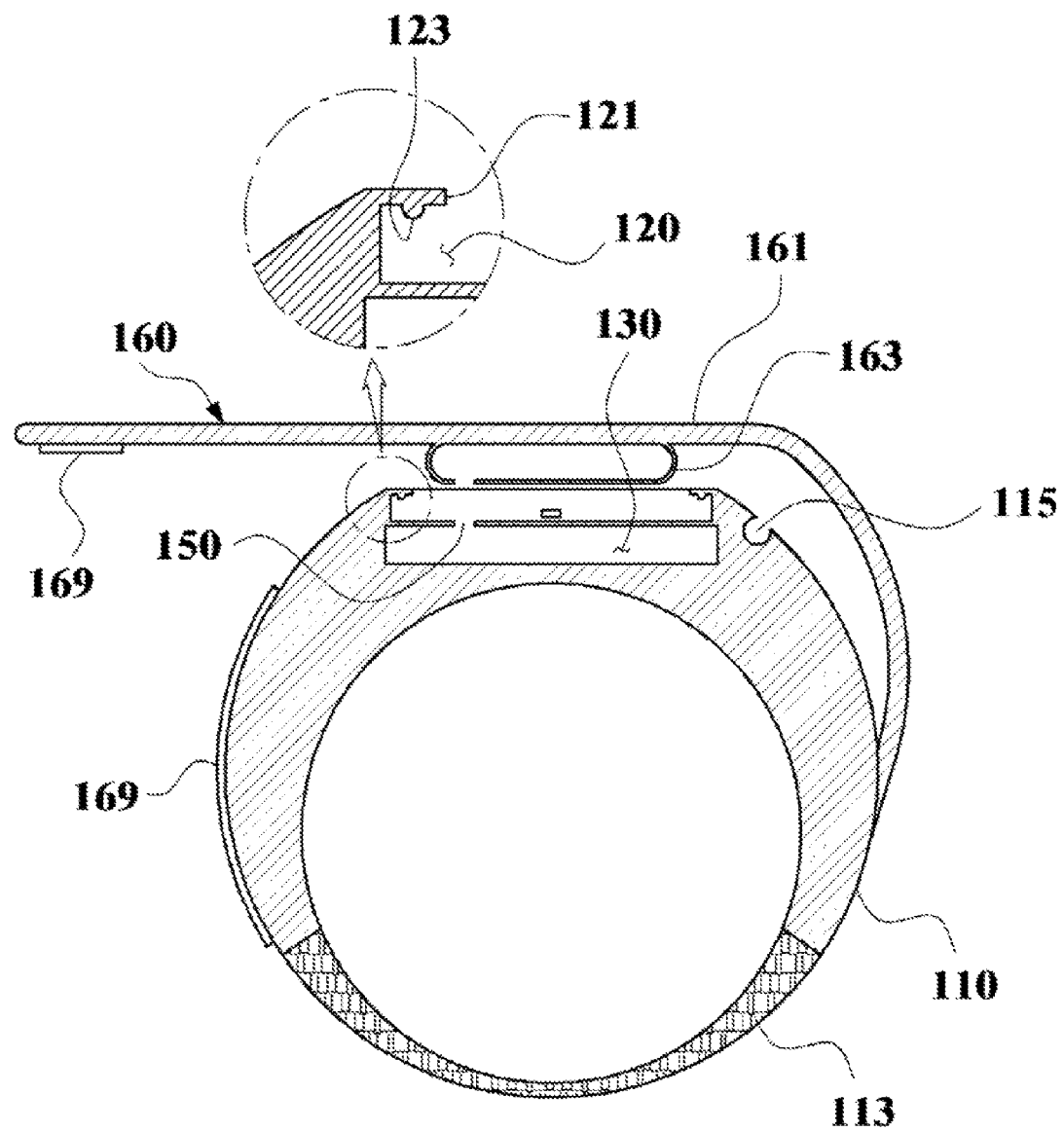

In more detail, as shown in FIGS. 1 to 3, the body 110 has a configuration to wear or carry in a user body in a state in which an electronic device E is received and includes an opening 111, an expansion member 113, an insertion groove 115, and an insertion hole 117. In this case, it is shown that the body 110 is inserted into the outside of a body through the opening 111 to be worn, but this is an exemplary embodiment, it is preferable that the power supply device is formed to carry or wear in a pocket or a belt according to a size or a weight of the electronic device E.

The opening 111 is formed by punching from one end to the other end of the body 110 to enable to wear power supply device by enclosing a user body, i.e., an arm, a leg, or a waist.

The expansion member 113 is provided in a lower portion of the body 110 and is made of a material such as flexible spandex to extend or contract according to a user body condition to adjust a diameter width of the opening 111.

The insertion groove 115 is formed in a lengthwise direction at an outer surface of the body 110 and inserts a charge cable 142 therein. In this case, it is preferable that an inner diameter of the insertion groove 115 is formed in the same size as or in a size smaller than an outer diameter of the charge cable 142 to fix by forced insertion into the insertion groove 115 so that a terminal formed at both sides of the charge cable 142 coupled to the battery 140 and the electronic device E does not deviate by a rapid movement of a user.

The insertion hole 117 is formed by punching from an inner surface of the support groove 120 in an outer surface direction of the body 110 and inserts a terminal of the charge cable 142 electrically connected to the battery 140 to enable to charge the electronic device E received in the support groove 120.

Further, the support groove 120 is formed at an upper surface of the body 110 to have a shape corresponding to a shape of the electronic device E to receive. In this case, it is preferable that the support groove 120 has a jaw 121 of a belt form formed in an upper portion so as to insertion couple a circumferential edge portion of the received electronic device E, and at a lower surface of the jaw, in order to enhance a pressing force of the received electronic device E, a protrusion 123 is protruded downward.

Further, the insertion groove 130 is formed in the body 110 so that the battery 140 injects/discharges from the outside to the inside of the body 110. In this case, it is preferable that the insertion groove 130 is formed in the body 110 to locate in a lower portion of the support groove 120 so that the contact point pin 147 provided in the battery 140 is exposed to the outside through a first through hole 150 formed at a bottom surface of the support groove 120.

Further, as shown in FIGS. 1 and 4, after the battery 140 is previously charged through external power, the electronic device E received in the support groove 120 has a configuration to charge upon discharging and includes a first charge terminal 141, a second charge terminal 143, a switch 145, a contact point pin 147, an indicating lamp 149, and a charge cable 142. In this case, it is preferable that the first charge terminal 141, the second charge terminal 143, the switch 145, and the indicating lamp 149 are each provided at the front side of the battery 140 to manipulate by a user at the outside in a state in which the battery 140 is inserted into the insertion groove 130.

Further, a charge capacity of the battery 140 has a capacity to perform complete charge of at least twice in a lithium battery (not shown) provided in the electronic device E based on an amount in which charge is complete.

The first charge terminal 141 is connected to a terminal formed at one end of the charge cable 142 and applies and enables to charge power charged within the battery 140 through the charge cable 142 to the discharged electronic device E.

The second charge terminal 143 receives external power through an adaptor (not shown) to enable to charge power that can charge to the electronic device E to the battery 140.

The switch 145 is formed so that a user selects a battery charge mode that charges power into the battery 140 through external power and an electronic device charge mode that can charge power charged in the battery 140 to the electronic device E through the charge cable 142. In this case, it is preferable that the switch 145 enables to receive and charge power charged to the battery 140 to the electronic device E through the charge cable 142 while external power is charged to the battery 140 in a battery charge mode, thereby shortening a charge time of the electronic device E.

The contact point pin 147 is provided at an upper surface of the battery 140 and is exposed to the outside through the first through hole 150 to be electrically connected to a terminal E1 of the electronic device E received in the support groove 120. In this case, it is preferable that the contact point pin 147 is protruded for easy contact with a terminal formed in the electronic device E and that a location of the contact point pin 147 changes according to a kind of the electronic device E received in the support groove 120.

The indicating lamp 149 is provided with a light emitting diode (LED) and is provided so that a user identify a charge amount of power charged to the battery 140 by external power by a naked eye. In this case, it is preferable that the indicating lamp 149 is provided with a plurality of LEDs, as needed, to measure a charge amount of the battery 140 or to determine a charge amount with a color change of the LED.

The charge cable 142 is formed in a lengthwise direction and thus a terminal 142a is formed at each of both sides so that one end is connected to the first charge terminal 141 and the other end is connected to the electronic device E, and an outer surface is provided to insertion couple to the insertion groove 115 and enables to charge to the electronic device E through the battery 140. That is, when a terminal contacting with the contact point pin 147 is not formed in the electronic device E, the charge cable 142 may enable to charge to the electronic device E through the battery 140 instead of the contact point pin 147.

Further, the first through hole 150 is formed by punching at a bottom surface of the support groove 120 so that the support groove 120 and the insertion groove 130 each formed in the body 110 are connected, and the contact point pin 147 formed in the battery 140 is penetrated to connect to a terminal of the electronic device E and thus charge may be performed. In this case, it is preferable that the first through hole 150 is formed by punching at a bottom surface of the support groove 120 according to a location of the contact point pin 147 formed in the battery 140 or a terminal location formed in the electronic device E, is formed in plural at a bottom surface of the support groove 120 to correspond to a charge terminal having different locations according to the electronic device E to enable easy charge of the electronic device E through the contact point pin 147.

Further, the pressing portion 160 has a configuration of enhancing a fixing force between the electronic device E and the body 110 by pressing an outer surface of the electronic device E received in the support groove 120 and includes a cover 161, a pressing body 163, and a space portion 165.

The cover 161 is formed to entirely have a plate shape, one end thereof is formed to connect to an outer surface of the body 110, and the cover 161 is fixed to detach from the body 110 through the fixing member 169 provided in the other end by rotating to enclose the electronic device E in which an outer surface of the cover 161 is received in the support groove 120. In this case, in the fixing member 169, it is preferable that a Velcro tape provided in each of an outer surface of the cover 161 and an outer surface of the body 110 or a snap button coupled in a female and male form is used, and the fixing member 169 provided at an outer surface of the body 110 is long provided in a lengthwise direction along an outer surface of the body 110 or is provided in plural to be formed to adjust a length from the fixing member 169 provided at an outer surface of the cover 161.

Further, when the cover 161 rotates, in order to enhance separation prevention of the charge cable 142 inserted into the insertion groove 115, the cover 161 is provided in the body 110 to enclose an upper portion of the insertion groove 115.

The pressing body 163 is made of a material having elasticity and is provided to press an outer surface of the cover 161, i.e., an upper surface of the electronic device E received in the support groove 120 when the cover 161 rotates. In this case, it is preferable that the pressing body 163 is protruded from an outer surface of the cover 161 to increase a pressing force of the electronic device E.

That is, the pressing body 163 is inserted into a jaw 121 to enhance a fixing force by pressing an upper surface of the electronic device E having a size of a level to be received in the support groove 120, but the electronic device E having a size of a level not to be completely inserted into the jaw 121 formed in the support groove 120 may be received and fixed in the support groove 120 through pressing of the pressing body 163, as needed.

The space portion 165 is formed within the pressing body 163 and is formed in a state in which one end thereof is opened for easy injection/discharge of the electronic device E to receive the electronic device E.

Figure 5:
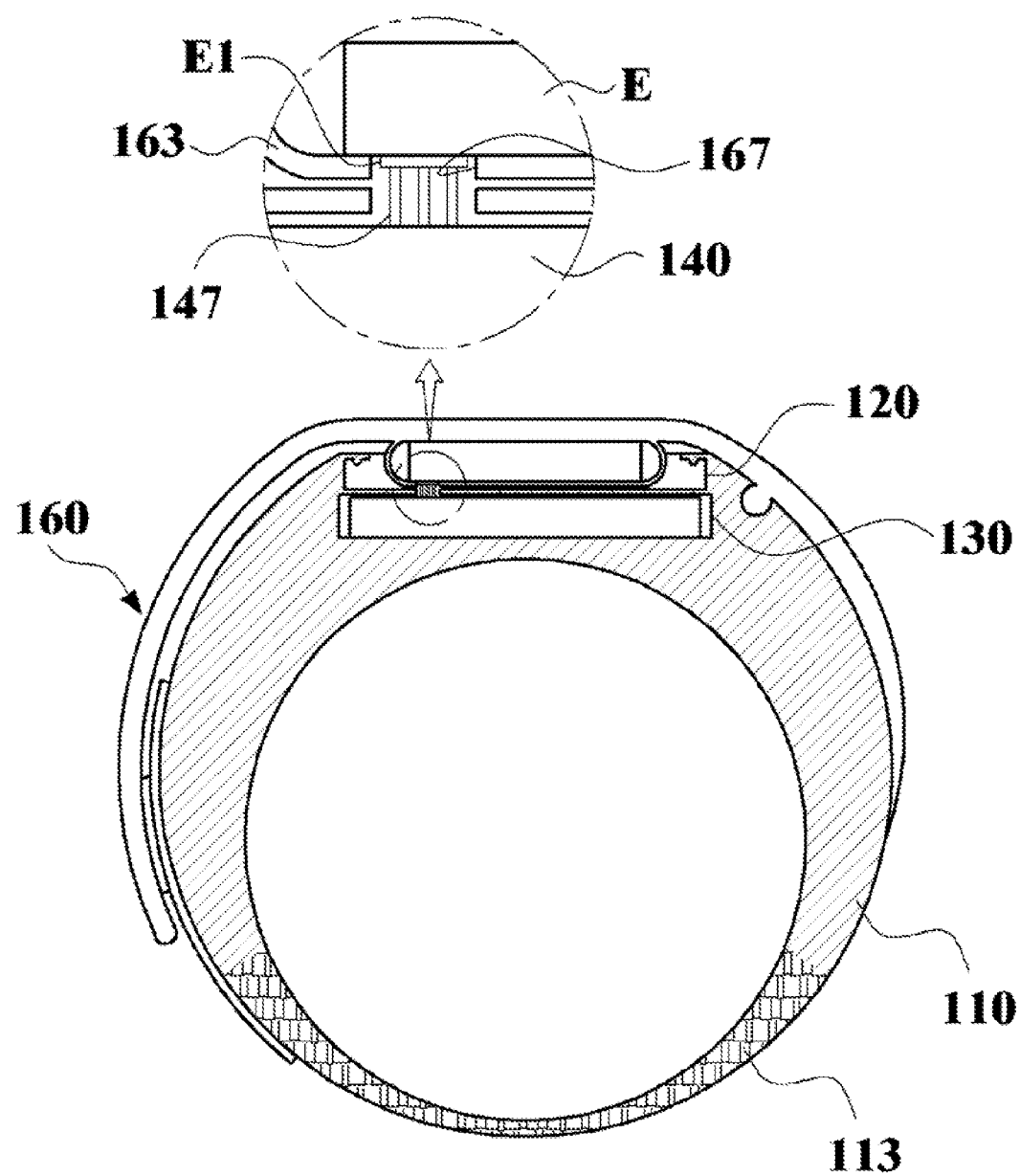
FIG. 5 is a cross-sectional view illustrating a use state of an electronic device received in a pressing body of a power supply device of an electronic device according to an exemplary embodiment of the present invention.

Therefore, as shown in FIG. 5, in a case in which a size of the electronic device E has a relatively small size to be received in the support groove 120, by enabling the electronic device E to locate within the support groove 120 by rotating the cover 161 in a state in which the electronic device E having a small size is received in the space portion 165, the electronic device E having a small size may be received. In this case, at an outer surface of the pressing body 163 in which the space portion 165 is formed, when the cover 161 rotates, it is preferable that a second through hole 167 is formed at a location opposite to the first through hole 150 to charge through the contact point pin 147 of the battery 140 even to the electronic device E received in the space portion 165.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The exemplary embodiments should be considered in descriptive sense only and not for purposes of limitation. Therefore the scope of the invention is defined not by the detailed description of the invention but by the appended claims and all differences within the scope will be construed as being comprised in the present invention.

| [Description of symbols] |
| --- |
| 100: power supply device of electronic device |
| 110: body 111: opening |
| 113: expansion member 115: insertion groove |
| 117: insertion hole 120: support groove |
| 130: insertion groove 140: battery |
| 141: first charge terminal 142: charge cable |
| 143: second charge terminal 145: switch |
| 147: contact point pin 149: indicating lamp |
| 150: first through hole 160: pressing portion |
| 161: cover 163: pressing body |
| 165: space portion 167: second through hole |
| 169: fixing member |

What is claimed is:

1. A power supply device of an electronic device, the power supply device comprising:
    a body formed to wear or to carry in a user body;
    a support groove formed in an upper portion of the body and received to enclose a circumferential edge of the electronic device;
    an insertion groove formed to insert from the outside to the inside of the body;
    a battery inserted into the insertion groove and that charges power applied from the outside and that charges the electronic device through charged power;
    a first through hole punched in the support groove so that the electronic device and the battery contact each other; and
    a pressing portion that presses to enclose the electronic device received in the support groove and that is provided to receive in the body regardless of a shape or a size of the electronic device.

2. The power supply device of claim 1, wherein the body comprises:
    an opening punched from one end to the other end of the body so as to wear in a user body; and
    an expansion member formed to extend in a lower portion of the body and that adjusts a diameter width of the opening according to a body of a wearer.

3. The power supply device of claim 1, wherein the battery comprises:

a second charge terminal that charges external power to the battery through an adaptor;

a switch provided to select one of a battery charge mode that charges power to the battery by the external power and an electronic device charge mode that charges power charged in the battery to the electronic device;

a contact point pin formed at an upper surface of the battery to expose to the outside through the first through hole and that contacts with the electronic device to enable to charge; and an indicating lamp that displays an amount charged within the battery.

4. The power supply device of claim 1, wherein the battery comprises a charge cable cable-connected to the battery so as to charge the electronic device received in the support groove, wherein the charge cable is insertion coupled to an insertion groove formed in a lengthwise direction at an outer surface of the body.

5. The power supply device of claim 4, wherein the battery further comprises a first charge terminal connected to one end of the charge cable.

6. The power supply device of claim 1, wherein the pressing portion comprises:

a cover rotatably formed so that one side is connected to an outer surface of the body and that encloses the electronic device received in the support groove by a rotation; and a pressing body provided at an outer surface of the cover and that presses an upper surface of the electronic device when the cover rotates.

7. The power supply device of claim 6, wherein the pressing body has a space portion that receives the electronic device therein.

* * * * *